Dec. 28, 1948. G. C. WILSON 2,457,336
INJECTION MOLD
Filed July 11, 1942 3 Sheets-Sheet 1

Inventor
Gardner C Wilson
by
Walter & Kaufman
Attorney

Dec. 28, 1948.　　　　G. C. WILSON　　　　2,457,336
INJECTION MOLD

Filed July 11, 1942　　　　　　　　　　3 Sheets-Sheet 2

Inventor
Gardiner C. Wilson
by
Walter & Kaufman
Attorney

Dec. 28, 1948. G. C. WILSON 2,457,336
INJECTION MOLD
Filed July 11, 1942 3 Sheets-Sheet 3

Inventor
Gardiner C. Wilson
by
Walter + Kaufman
Attorney

Patented Dec. 28, 1948

2,457,336

UNITED STATES PATENT OFFICE 2,457,336

INJECTION MOLD

Gardiner C. Wilson, Lancaster, Pa., assignor to Armstrong Cork Company, Lancaster, Pa., a corporation of Pennsylvania Application July 11, 1942, Serial No. 450,541

12 Claims. (Cl. 18—42)

This invention relates to injection molding devices for forming from thermoplastic composition such as cellulose acetate or polystyrene compositions, a plurality of internally threaded articles and, more particularly, to an injection molding device for molding a plurality of internally threaded closures having a spherical, globular, bulb-like, or pear-shaped contour.

Closures of such particular configuration are exceedingly difficult to mold satisfactorily in known injection molding equipment. Such equipment usually includes a pair of opposed mold-backing platens and an injector all mounted upon a base frame. Companion molding plates are carried respectively by said platens and cooperating mold cavities may be provided in such plates. One of the plates is a resistance member usually held in a fixed position while the other is a pressure transmitting member reciprocable toward and from the resistance plate to close and open the sectional mold. At the parting line or parting plane of the molds, runner channels are provided to distribute the charge injected through the sprue by the injector to the cavities. In such equipment, the gate is generally placed on the parting plane of the mold so that it must be removed from the molded article. It is impossible to remove the gate so formed in any kown practical and economical manner without leaving an unsightly mark on the exterior of the finished closure which detracts from the appearance and destroys the aesthetic appeal of the finished closure.

The chief object of the present invention is to provide injection molding equipment for molding interiorly threaded articles having a spherical, globular, bulb-like, or pear-shaped exterior configuration. An object of the invention is to provide injection molding equipment for molding interiorly threaded closures in which the gate through which molding composition is injected into the mold cavity is disposed at a point of the cavity which permits removal of the molded runner without leaving a readily observable, unsightly mark on the closure in use. A further object is to provide injection molding equipment in which at least a portion of the runner channel connecting the cavity and the injection nozzle is disposed at a point other than the parting line of the mold in order to obviate a gate at the parting line of the mold. A still further object is to provide injection molding equipment in which the gate leading to the cavity is disposed at an end of the cavity and, preferably, at the end of the cavity formed in the reciprocable portion of the mold.

A still further object is to provide injection molding equipment for molding simultaneously a plurality of internally threaded closures having a spherical, globular, bulb-like or pear-shaped exterior contour in which the gates leading to the respective mold cavities are disposed at a point of the respective cavities not apparent to the casual observer upon consideration of the finished closure and in which the marks or marring of the exterior surface of the closure occasioned by the removal of the runner are not apparent to the causal observer when the closure is in use. A still further object is to provide injection molding equipment for internally threaded articles which permits ready and speedy removal of the molded article from the mold.

This invention relates to injection molding devices for molding simultaneously a plurality of internally threaded articles such as closures of spherical, globular, bulb-like or pear-shaped exterior contour. The device includes a fixed resistance plate having a plurality of mold cavities, and pressure mechanism reciprocable toward and from the fixed plate. The pressure mechanism includes a mold plate, a platen, a backing plate and mold members extending through the mold plate which has cavities adapted to cooperate with the cavities in the fixed resistance plate to form a molded article when the mold is closed. A plurality of rotatable threaded members are provided extending through the cavities in said mold members and into the cavities in the fixed plate when the mold is closed to form the interior surface of the closure. The mold plate as pointed out above is reciprocable toward and from the fixed plate with the remainder of the pressure mechanism and in addition is yieldably carried on the guide pins of the device so that it is held under compression when the mold is closed and is adapted upon opening of the mold and rotation of the threaded members to urge the molded articles outwardly. Preferably, the mold members are sectional, one section being attached to the mold plate and being yieldable therewith, the other section being attached to the platen. An injection nozzle is provided adapted to inject molding composition into a sprue or charging port in the fixed plate. Runner channels extend from the charging port and are disposed at the parting plane of the mold. Gates or channels are provided extending upwardly adjacent the threaded members from the end or base of the cavity in each mold member and extend downwardly and outwardly between the sections of the mold member to join the runner channels thus permitting molding composition to be injected into the cavities when the mold is closed. By this means, molding composition may be injected into the end of each cavity when the mold is closed thus obviating a gate on the article at a place where its removal would leave a readily observable, unsightly mark.

The attached drawing illustrates a preferred embodiment of my invention, in which Figure 1 is a plan view of the pressure-transmitting mold plate;

Figure 1:
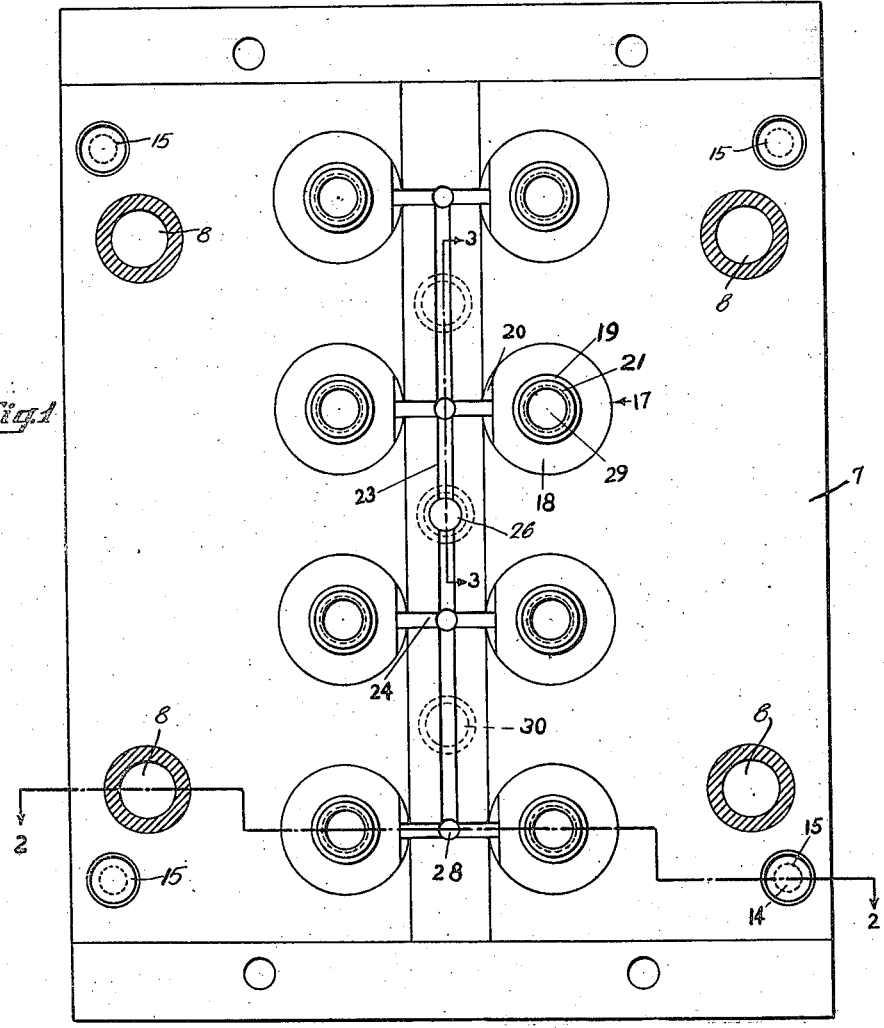

Referring to the drawings, there is shown a conventional form of injection molding device which includes a fixed resistance plate 2, pressure mechanism designated generally at 3 reciprocable toward and from the fixed plate 2, and an injector 4 all suitably mounted upon a base frame (not shown). Pressure mechanism 3 includes a backing plate 5, a platen 6, and a mold plate 7, the platen and mold plate being carried by guide pins 8. Plate 2 contains a plurality of mold cavities 9 adapted to form at least a portion of the article to be molded. For ease in making various sizes of articles, the cavities 9 are formed in small plates 10 disposed in openings in the plate 2 and attached to a backing member 2a by machine screws 11. Injector 4 (Figure 3) projects into a central opening in the plate 2 and is adapted to inject thermoplastic molding composition into a single sprue or charging port 12 disposed in fixed plate 2.

Figure 2:
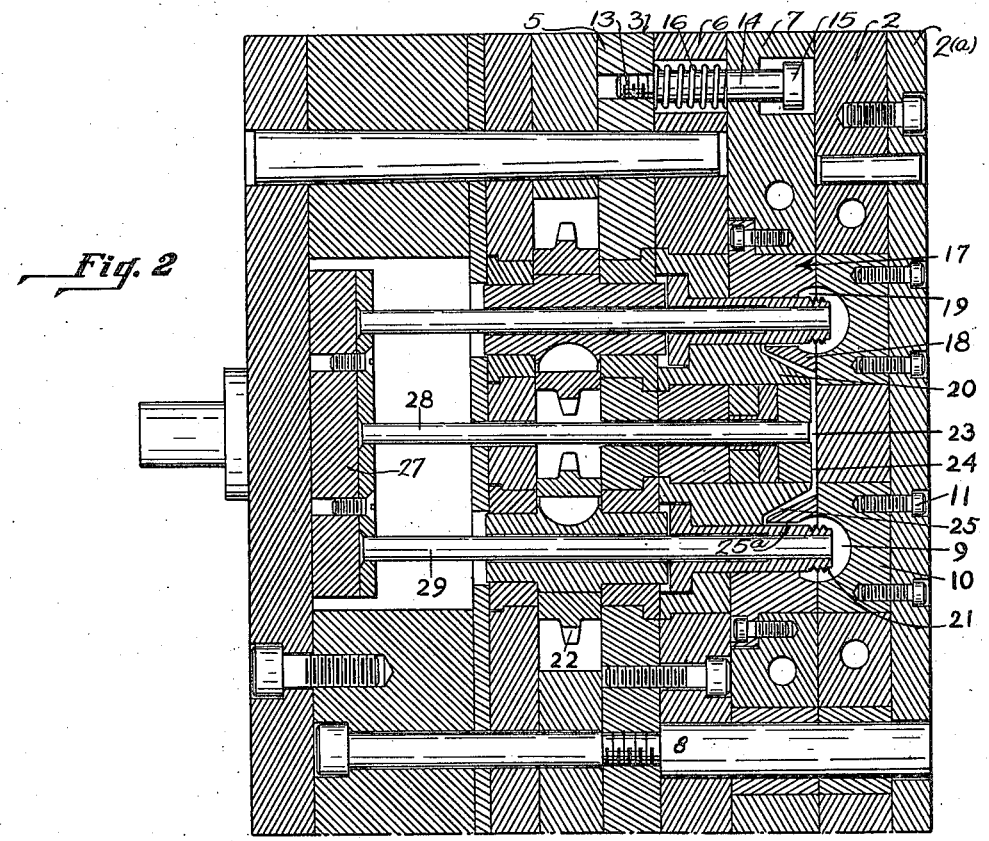
Figure 2 is a sectional view taken along the line 2—2 of Figure 1 illustrating the injection molding device in closed position in cooperation with a fixed mold plate also shown in section.

Plate 7 is yieldingly carried or supported on the guide pins 8 as shown in Figure 2. Aligned openings are provided in plate 7, platen 6 and backing plate 5. The opening in plate 5 is provided with threads; the opening in plate 7 is provided with a shoulder for a purpose hereinafter explainer. Threaded ends 13 of rods 14 are secured in the openings in plate 5, the opposite ends of rods 14 are provided with heads 15. Springs 16 surround rods 14 and are disposed within openings in the platen 6 and are held between backing plate 5 and mold plate 7. Thus, when the mold is open as shown in Figure 5, plate 7 is yieldingly urged outwardly until such outward movement is halted by the heads 15 of rod 14 engaging the shoulders provided in the openings in plate 7. When the mold is closed as shown in Figure 2, plate 7 is disposed adjacent platen 6, as more fully described hereinafter.

It is not essential in my invention that the plate 7 be yieldingly supported in the manner illustrated since, in some cases, it may be desirable to provide extensions to platen 6 and plate 7 and to place the yieldable means therein for ease in replacement and adjustment.

Mold members 17 are provided in plate 7. Each of members 17 is composed of two sections; section 18 of member 17 has a cavity 19 therein adapted to coperate with cavity 9 to form a molded article and is attached to plate 7 so that it is yieldable therewith. Section 20 of member 17 is attached to platen 6.

Threaded members 21 adapted to form the interior surface of the molded article extend through mold members 17. Members 21 are so disposed that they extend through cavities 19 and into cavities 9 when the mold is closed. For ease in description, I will describe only one member 21 since the members are similar in design and actuated in the same manner. Each member 21 is held in predetermined position and is rotatable about its axis but is not movable to any substantial extent in the direction of its axis. A pinion gear 22 is connected to the lower portion of member 21 and is adapted to be engaged by a second gear (not shown) driven by any suitable actuating means to rotate member 21.

Runner channels 23 extend from charging port 12. Secondary runner channels 24 extend from channels 23. Tertiary channels or gates 25a extend upwardly from cavities 19 (in a direction parallel to the axes of cavities 19) in sections 18 of mold members 17 adjacent threaded members 21 and then extend downwardly and outwardly as shown at 25 between sections 18 and 20 of members 17 (inclined toward the parting line of the mold) to connect cavities 19 with channels 24. It will be observed that, when the mold is closed, molding composition is injected into charging port 12 and along channels 23, into channels 24 and thence along channels 25 and 25a into the end of each cavity 19. This is of particular importance since the composition is not injected into the mold cavity at the parting plane of the mold or, in fact, at any point of the cavity where the unsightly mark occasioned by the removal of the gate from the molded closure is apparent to the casual observer. Any mark left by the removal of the gate from the molded closure is present on the bottom of the closure and cannot be observed without particular and careful inspection of the closure. In addition, the gate formed by the composition in the channel 25a serves to prevent rotation of the molded article upon rotation of member 21, as will be more fully explained hereinafter.

Figure 3:
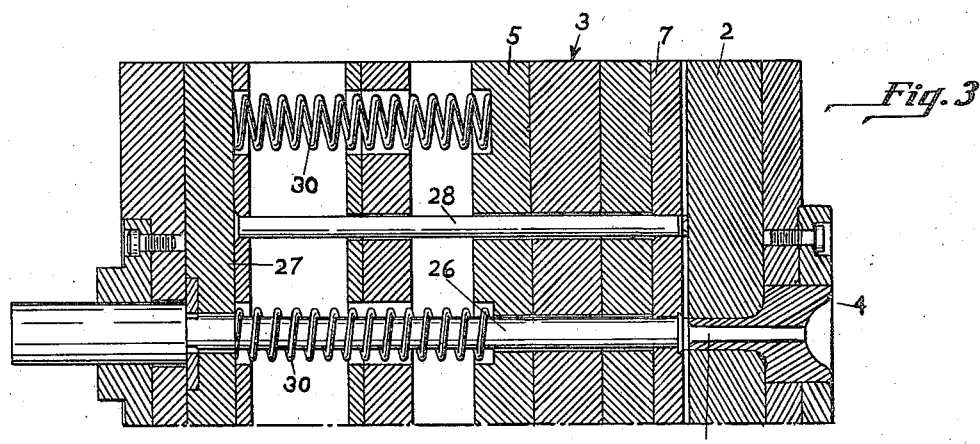
Figure 3 is a sectional view taken along line 3—3 of Figure 1 with a fixed mold plate and charging sprue shown in section.
Figure 4:
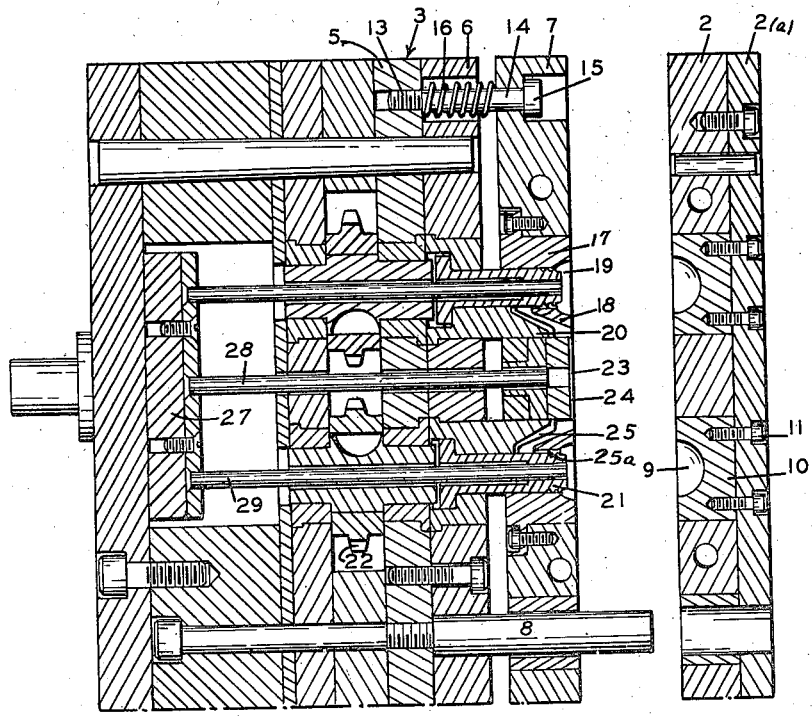
Figure 4 is a sectional view of the equipment shown in Figure 2 with the mold elements in open or discharged position.

Plunger 26 is provided centrally of plate 7 opposite the charging port 12. Plunger 26 is connected to a plunger plate 27 and is reciprocable horizontally as shown in Figure 3. Plungers 28 are also provided at the junctures of channels 24 with channels 23. The plungers 28 are also connected to plate 27 and are reciprocable horizontally thereby. Similar plungers 29 also actuated by plate 27 are provided extending centrally of each threaded member 21. The purpose of these various plungers will be described hereafter. To assure that plunger plate 27 is positively returned at the end of each stroke, springs 30 are provided disposed between plate 27 and backing plate 5 adapted to be held under compression when plate 27 is moved forward to advance the various plungers 26, 28, 29.

When the mold is in open position as shown in Figure 5, the fixed resistance plate 2 and the pressure mechanism 3 are not contiguous while plate 7 is urged away from platen 6 by springs 16. As the mold is closed by the advance of the pressure mechanism 3 toward plate 2, plate 7 first engages the surface of plate 2 and its advance ceases while platen 6 continues to move forward, thus compressing springs 16, until platen 6 is in substantial engagement with plate 7. The threaded members 21 extend through the cavities 19 and into cavities 9 as the mold closes. The runner channels 23 are thus disposed in alignment with port 12 so that the port 12 and the various mold cavities are connected.

Injector 4 then injects thermoplastic composition into charging port 12 from whence it flows along channels 23, 24 and 25 and 25a to fill the molds formed by cooperating cavities 9 and 19 in fixed plate 2 and mold members 17. After the composition has set, the molded element consists of a plurality of internally threaded closures connected by bars formed from the composition in channels 22, 23 and 24 and port 12.

To release the molded closures, the pressure mechanism 3 is moved rearwardly, removing the molded articles from cavities 9 in plate 2. The sections 18 are still held under compression since the molded articles remain attached to the surfaces of cavities 19 and to threaded members 21. As mechanism 3 continues to move rearwardly, members 21 are rotated. Plate 7, since it is urged outwardly by the compressed springs 16, thus "backs off" the closures from members 21. As the members 21 begin their rotation and the closures begin to back off, the gates formed by composition in channels 25, 25a are broken at their weakest section and the channels 25 are so designed that the weakest portion is formed at the juncture of the upwardly extending portion 25a leading from cavity 19 and the downwardly and outwardly extending portion 25 connecting it to channel 24. The gate portion remaining attached to the closure aids in preventing rotation thereof during the rotation of members 21.

At such stage of operation, the runners, of course, remain in the various channels while the closures are still retained in cavities 19. As rearward movement of mechanism 3 continues, plunger plate 27 is moved forward to advance plunger 26, plungers 28, and plungers 29. Plunger 26 and plungers 28 force the runners from channels 23, 24, and such runner portions as remain in channel 25 while plungers 29 force the closures and the attached gates from the cavities 19 and channels 25a. It will be appreciated the sectional construction of members 17 facilitates the removal of the runners from the channels. If inadvertently, the runner is broken and some portion of it remains in channel 24, such portion can be readily removed without difficulty since the two sections 18 and 20 of each mold member 17 are held apart by the springs 16. The closures and runners may drop into any suitable receptacle provided below the mold. The gates may then be severed from the closures by any suitable means.

It will be noted my invention provides ready and simple mechanism for molding difficulty moldable articles such as closures of spherical, globular, bulb-like or pear-shaped contour in such manner that unsightly marks occasioned by removal of the molded gate are not apparent to the casual observer. The means of removal of the molded articles from the mold, are simple, economical and highly satisfactory in operation and do not affect the decorative appearance of the closures.

While I have described and illustrated preferred embodiments of my invention it will be understood my invention is not limited thereto since it may be otherwise embodied within the scope of the following claims.

I claim:

1. In an injection molding machine adapted to form simultaneously a plurality of internally threaded articles, the combination of a fixed resistance plate having cavities therein, a platen, a movable mold plate having a plurality of openings therein, said mold plate being supported by said platen and movable toward and from said fixed plate, means for yieldably supporting said mold plate including springs so disposed as to urge said plate away from said platen as a unit to apply force to the molded articles to release them from threaded members, injecting means, headed rods passing through said movable mold plate and said platen with said springs disposed about said rods, the heads on said rods limiting movement of said movable mold plate by said springs, rotatable threaded members adapted to extend through the openings in the mold plate and into the fixed plate cavities when the mold is closed to form the interior surface of the molded articles, and runner channel connecting the injecting means and the mold cavities, said yieldably supported mold plate being held under compression when the mold is closed and being adapted upon opening of the mold and rotation of said threaded members to urge the molded articles outwardly to release them from said members.

2. In an injection molding device adapted to form simultaneously a plurality of internally threaded articles, the combination of a fixed resistance plate having mold cavities therein, a platen, a movable mold plate having a plurality of openings therein, said mold plate being supported by said platen and movable toward and from said fixed plate, injecting means, means for yieldably supporting said mold plate, said yieldable supporting means including headed rods passing through said mold plate and springs disposed about said rods and engageable with said movable mold plate to urge said plate away from said platen as a unit to apply force to the molded articles to release them from rotatable members, rotatable members adapted to extend through the openings in the movable mold plate and into the fixed plate cavities when the mold is closed to form the interior surface of the molded articles, and runner channels connecting the cavities and the injecting means to permit composition to be injected into the cavities, said yieldably supported mold plate being held under compression when the mold is closed and being adapted upon opening of the mold and rotation of said members to urge the molded articles outwardly to release them from said members.

3. In an injection molding device adapted to form an internally threaded article, the combination of a fixed resistance plate having a cavity therein, a platen, a mold plate yieldably supported by said platen and movable toward and from said fixed plate and having a cavity therein adapted to cooperate with the cavity in said fixed plate when the mold is closed to form a molded article, injecting means, a rotatable threaded member adapted to extend through the movable plate cavity and into the fixed plate cavity when the mold is closed to form the interior surface of the molded article, a runner channel disposed at the parting line of the mold extending from said injecting means, a channel extending from the cavity in the movable mold plate at a point adjacent said threaded member, and connecting the cavity and the runner channel to permit composition to be injected into the cavity at a point other than the juncture of the cooperating cavities when the mold is closed, said yieldably supported mold plate being held under compression when the mold is used and being adapted upon opening of the mold and rotation of said member to urge the molded article outwardly to release it from said member and to separate it from the runner, means to remove the molded article from the movable plate cavity, and means to eject the runner from the channels.

4. In an injection molding device, the combination of a fixed mold plate having cavities adapted to form a portion of a molded article, an extrusion nozzle extending through said plate, a platen movable toward and from said plate, a second mold plate yieldably supported by said platen, sectional mold members disposed in said second mold plate, one section of such member being supported by the second plate and having a cavity therein adapted to cooperate with a cavity in said fixed plate to form a molded article, a second section of each member being secured to said platen, runner channels disposed at the parting line of the mold extending from said nozzle, and channels extending in a direction parallel to the axes of the cavities in said mold member and then inclined toward the parting line of the mold between the sections thereof to connect the cavities and the runner channels to permit composition to be injected into the cavities at a point other than the juncture of the cooperating cavities when the mold is closed, said yieldably supported mold plate being held under compression when the mold is closed and being adapted upon opening of the mold to urge the molded article outwardly to release it from the section of said mold member secured to said platen.

5. In an injection molding device, the combination of a fixed mold plate having cavities adapted to form a portion of a molded article, an extrusion nozzle extending through said plate, a platen movable toward and from said plate, a second mold plate yieldably supported by said platen, sectional mold members disposed in said second mold plate, one section of such member being supported by the second plate and having a cavity therein adapted to cooperate with a cavity in said fixed plate to form a molded article, a second section of each member being secured to said platen, members adapted to extend through the cavities in said mold member and into the cavities in said fixed plate when the mold is closed to form the interior surface of the molded article, runner channels disposed at the parting line of the mold extending from said nozzle, and channels extending from the cavities in said mold member adjacent said interior surface forming member and between the sections of said mold member to connect the cavities and the runner channels to permit composition to be injected into the cavities at a point other than the juncture of the cooperating cavities when the mold is closed, said yieldably supported mold plate being held under compression when the mold is closed and being adapted upon opening of the mold to urge the molded article outwardly to release it from the section of the mold member secured to the platen.

6. In an injection molding device adapted to form an internally threaded article, the combination of a fixed resistance plate having cavities therein, an extrusion nozzle extending through said plate, pressure mechanism reciprocable toward and from said plate, said mechanism including a mold plate, a platen, said mold plate being yieldably supported by said platen, sectional mold members disposed in said mold plate, one section of each member being attached to the mold plate and having a cavity therein adapted to cooperate with a cavity in said fixed plate to form a molded article, a second section of each member being secured to said platen, rotatable threaded members extending through the cavities in said sectional mold members and into the cavities in the fixed plate when the mold is closed to form the interior surface of the molded article, runner channels disposed at the parting line of the mold extending from said nozzle, and channels extending in a direction parallel to the axes of the cavities in said sectional mold member and then inclined toward the parting line of the mold between the sections thereof to connect the cavities and the runner channels to permit composition to be injected into the cavities at the ends thereof when the mold is closed, said mold plate being held under compression when the mold is closed and being adapted upon opening of the mold and rotation of said threaded members to urge the molded articles outwardly to release them from the threaded member.

7. In an injection molding device adapted to form an internally threaded article, the combination of a fixed resistance plate having cavities therein, an extrusion nozzle extending through said plate, pressure mechanism reciprocable toward and from said plate, said mechanism including a mold plate, a platen, said mold plate being yieldably supported by said platen, sectional mold members disposed in said mold plate, one section of each member being attached to the mold plate and having a cavity therein adapted to cooperate with a cavity in said fixed plate to form a molded article, a second section of each member being secured to said platen, rotatable threaded members extending through the cavities in said sectional mold members and into the cavities in the fixed plate when the mold is closed to form the interior surface of the molded article, runner channels disposed at the parting line of the mold extending from said nozzle, channels extending in a direction parallel to the axes of the cavities in said sectional mold member and then extending toward the parting line of the mold between the sections thereof to connect the cavities and the runner channels to permit composition to be injected into the cavities at the ends thereof when the mold is closed, said mold plate being held under compression when the mold is closed and being adapted upon opening of the mold and rotation of said threaded members to urge the molded articles outwardly to release them from the threaded member, and means to remove the molded articles from the sectional mold members.

8. In an injection molding device adapted to form an internally threaded article, the combination of a fixed resistance plate having cavities therein, an extrusion nozzle extending through said plate, pressure mechanism reciprocable toward and from said plate, said mechanism including a mold plate, a platen, said mold plate being yieldably supported by said platen, sectional mold members disposed in said mold plate, one section of each member being attached to the mold plate and having a cavity therein adapted to cooperate with a cavity in said fixed plate to form a molded article, a second section of each member being secured to said platen, rotatable threaded members extending through the cavities in said sectional mold members and into the cavities in the fixed plate when the mold is closed to form the interior surface of the molded article, runner channels disposed at the parting line of the mold extending from said nozzle, and channels extending in a direction parallel to the axes of the cavities in said sectional mold member adjacent said threaded members and then inclined toward the parting line of the mold between the sections thereof to connect the cavities and the runner channels to permit composition to be injected into the cavities at the ends thereof when the mold is closed, said mold plate being held under compression when the mold is closed and being adapted upon opening of the mold and rotation of said threaded members to urge the molded articles outwardly to release them from the threaded member and to separate them from the runners, means to remove the molded articles from the sectional mold members, and means to eject the runners from the channels.

9. In an injection molding device adapted to form an internally threaded article, the combination of a fixed resistance plate having cavities therein, an extrusion nozzle extending through said plate, pressure mcehanism reciprocable toward and from said plate, said mechanism including a mold plate, a platen, yieldable means disposed between said platen and said mold plate adapted to urge said plate outwardly from said platen, sectional mold members disposed in said mold plate, one section of each of said mold members being attached to said mold plate and being movable therewith and having a cavity therein adapted to cooperate with a cavity in said fixed plate to form a molded article, the other section of each of said members being secured to said platen, rotatable threaded members extending through the cavities in said sectional mold members and into the cavities in said fixed plate, a runner channel disposed at the parting line of the mold extending from said nozzle, secondary channels extending from said runner channel toward said mold members, tertiary channels extending in a direction parallel to the axes of the sectional mold member cavities adjacent said threaded members and then inclined toward the parting line of the mold between the sections of said mold members to join the secondary channels thus permitting composition to be injected into the cavities at the ends thereof when the mold is closed, the mold plate and the attached sections of said mold members being held under compression when the mold is closed and being adapted upon opening of the mold to urge the molded articles outwardly to release them from the threaded members and to separate them from the molded runners, means to remove the molded articles from the sectional mold members, and means to eject the runners from the channels.

10. In an injection molding device, the combination of fixed mold plate having cavities adapted to form a portion of a molded article, an extrusion nozzle extending through said plate, a platen movable toward and from said plate, a second mold plate yieldably supported by said platen, sectional mold members disposed in said second mold plate, one section of said members being supported by the second plate and having a cavity therein adapted to cooperate with the cavity in said fixed plate to form a molded article, a second section of said members being secured to said platen, and runner channels connecting the mold cavities with the extrusion nozzle, said yieldably supported plate being held under compression when the mold is closed and being adapted upon opening of the mold to urge the molded article outwardly to release it from the section of said mold member secured to said platen.

11. In an injection molding device adapted to form internally threaded articles, the combination of a fixed resistance plate having cavities therein, an extrusion nozzle extending through said plate, pressure mechanism reciprocable toward and from said plate, said mechanism including a mold plate, a platen, said mold plate being supported by said platen, sectional mold members disposed in said mold plate, one section of each member being attached to the mold plate and having a cavity therein adapted to cooperate with the cavity in said fixed plate to form a molded article, a second section of each member being secured to said platen, means for yieldably supporting said mold plate to urge said plate away from said platen to apply force to the molded articles to release them from threaded members, rotatable threaded members extending through the cavities in said sectional mold members and into the cavities in the fixed plate when the mold is closed to form the interior surface of the molded article, and runner channels connecting said extrusion nozzle and the mold cavities, said mold plate being held under compression when the mold is closed and being adapted upon opening of the mold and rotation of said threaded members to urge the molded articles outwardly to release them from the threaded members.

12. In an injection molding machine adapted to form simultaneously a plurality of threaded articles, the combination of a fixed resistance plate having cavities therein, a backing plate, a platen secured to said backing plate, a mold plate yieldably supported by said platen movable toward and from said fixed plate, said backing plate, platen, and mold plate being provided with aligned openings, headed rods disposed in said openings, springs disposed about said rods and held between said backing plate and said mold plate to urge said mold plate away from said platen to apply force to the molded articles to release them from threaded members, injecting means, rotatable threaded members adapted to extend through the movable plate and into the fixed plate cavities when the mold is closed to form the interior surface of the molded articles, and runner channels connecting the injecting means and the mold cavities, said yieldably supported mold plate being held under compression when the mold is closed and being adapted upon opening of the mold and rotation of said threaded members to urge the molded articles outwardly to release them from said members.

GARDINER C. WILSON.

REFERENCES CITED

The following references are of record in the file of this patent:

UNITED STATES PATENTS

| Number | Name | Date |
| --- | --- | --- |
| 1,944,571 | Rahm | Jan. 23, 1934 |
| 2,047,379 | Matson | July 14, 1936 |
| 2,217,661 | Anderson | Oct. 15, 1940 |
| 2,227,263 | Knowles | Dec. 31, 1940 |
| 2,330,369 | Marsh | Sept. 28, 1943 |
| 2,339,443 | Wilson | Jan. 18, 1944 |

OTHER REFERENCES

Renwick: Mold Designed to Trim Sprues, March, 1942—Modern Plastics.

Felton: Approved Design for Injection Molds, May, 1941—Modern Plastics.

Certificate of Correction

Patent No. 2,457,336.  December 28, 1948.

GARDINER C. WILSON

It is hereby certified that errors appear in the printed specification of the above numbered patent requiring correction as follows:

Column 1, line 28, for "kown" read *known*; column 3, line 47, for "explainer" read *explained*; column 5, line 53, for the word "difficulty" read *difficultly*; column 6, line 14, for "channel" read *channels*; line 71, for "used" read *closed*; column 9, line 15, for "mcehanism" read *mechanism*;

and that the said Letters Patent should be read with these corrections therein that the same may conform to the record of the case in the Patent Office.

Signed and sealed this 19th day of April, A. D. 1949.

[SEAL]

THOMAS F. MURPHY,
*Assistant Commissioner of Patents.*